United States Patent [19]

Maher

[11] 4,066,426
[45] Jan. 3, 1978

[54] METHOD OF FORMING A GLASS-REACTED-CERAMIC WITH CADMIUM

[75] Inventor: Galeb H. Maher, North Adams, Mass.

[73] Assignee: Sprague Electric Company, North Adams, Mass.

[21] Appl. No.: 737,869

[22] Filed: Nov. 1, 1976

Related U.S. Application Data

[63] Continuation-in-part of Ser. No. 690,225, May 26, 1976, abandoned.

[51] Int. Cl.$^2$ ............................................. C03C 21/00
[52] U.S. Cl. ...................................... 65/18; 65/30 R; 65/32; 106/73.3; 106/73.31; 106/46; 106/39.8; 264/61; 264/65; 65/59 R
[58] Field of Search ............... 106/73.31, 73.3, 46; 65/18, 32, 30 R, 59 R; 65/59 R

[56] References Cited

U.S. PATENT DOCUMENTS

| | | | |
|---|---|---|---|
| 2,789,061 | 4/1957 | Coffeen | 106/73.31 |
| 3,529,978 | 9/1970 | Taylor et al. | 106/73.31 |
| 3,619,220 | 11/1971 | Maher | 106/39 R |
| 3,885,941 | 5/1975 | Maher | 106/73.3 |
| 4,017,291 | 4/1977 | Gliemeruth et al. | 65/30 R |

*Primary Examiner*—S. Leon Bashore
*Assistant Examiner*—Frank W. Miga
*Attorney, Agent, or Firm*—Connolly and Hutz

[57] ABSTRACT

A method for forming a cadmium-containing glass-reacted-ceramic body is described. This material is advantageously employed as the dielectric material in a capacitor. The method comprises mixing a barium-titanate alkaline-earth-metal-zirconate powder with glass powder, forming a cake or layer of the powder mix and firing the cake at from 1600° to 2050° F in a controlled cadmium containing atmosphere to sinter and densify the material. The cake is buried in an inert powder to which has been added a cadmium oxide powder to supply a source of cadmium external of the cake and to control the cadmium containing atmosphere during firing. Cadmium ions diffuse, during sintering, into the glass and further, into the ceramic grains to promote grain growth and to downwardly shift the Curie temperature.

12 Claims, 4 Drawing Figures

METHOD OF FORMING A GLASS-REACTED-CERAMIC WITH CADMIUM

CROSS-REFERENCE TO RELATED APPLICATION

This application is a continuation-in-part of U.S. application Ser. No. 690,225 filed May 26, 1976 now abandoned.

BACKGROUND OF THE INVENTION

The present invention relates to methods of making dielectric materials of the kind known as glass-reacted-ceramics, and more particularly to such methods wherein the glass-ceramic reaction during sintering results in a downward shift in the Curie temperature. It is known that the inclusion of a low melting temperature glass in a ceramic dielectric material makes possible the sintering and densification of the combination at relatively low firing temperatures. For example see the patent to G. Maher, U.S. Pat. No. 619,220 issued Nov. 9, 1971, and assigned to the same assignee as the present invention. Such low firing dielectric materials are especially advantageous for use in monolithic ceramic capacitors that may include relatively low cost silver-palladium electrodes.

A glass-reacted-ceramic is described in my U.S. Pat. No. 3,885,941, issued May 27, 1975 and assigned to the same assignee wherein cadmium from the glass is reacted with the ceramic to provide a high dielectric constant and a downward shift in the Curie temperature.

It is an object of this invention to provide an improved process for making a glass-reacted-ceramic material having more uniform and predictable electrical properties.

It is a further object of this invention to provide a process for making such dielectric materials wherein a higher dielectric constant and a further lowered Curie temperature may be achieved.

It is a further object of this invention to provide an improved process for making a glass-reacted-ceramic wherein the sintering temperature may be reduced.

It is yet a further object of this invention to provide an improved process for making a glass-reacted-ceramic wherein firing kiln contamination and escape of toxic gases is reduced.

SUMMARY OF THE INVENTION

In a method for making a glass-reacted-ceramic body, a high temperature ceramic material is mixed in fine powder form with a low melting temperature glass powder. The high temperature ceramic is comprised of a barium titanate and an alkaline-earth-metal zirconate. The ceramic may be presintered barium titanate wherein an alkaline-earth-metal zirconate is substituted in the lattice for from 1 to 6 mole percent of the barium titanate. Alternatively it may be a mixture of particles of a titanate and of a zirconate. The glass is any of a variety of glass compositions having a melting temperature under 1600° F. This powdered ceramic-glass mixture is homogenously dispersed in a liquid organic binder medium and subsequently screened, pressed, extruded or otherwise formed into a cake or layer that is then heated to burn off the organic binder medium. The cake is fired in a controlled cadmium-containing atmosphere to sinter the material and to cause cadmium from the atmosphere to diffuse into the glass and further, into the ceramic grains. This cadmium in the controlled atmosphere is preferably in the form of cadmium oxide but may also be elemental cadmium and is supplied at least in part from a source external to the cake. The atmosphere contains more cadmium than it would without the external source all other conditions remaining the same. Thus such atmospheres will be called cadmium enriched atmospheres.

The cadmium reacts with the ceramic and tends to promote grain growth resulting in an increase in the dielectric constant of the fired body at the Curie temperature. This cadmium reaction also causes a downward shift in the Curie temperature of the body. This controlled cadmium enriched atmosphere may be provided at firing by burying the cake in a course inert powder containing from 1-14 weight percent cadmium oxide. The cadmium oxide powder is thus placed adjacent to the cake and provides during firing a source of cadmium in the atmosphere external of the cake.

When the initial glass contains cadmium oxide and firing is accomplished in an open air atmosphere, some of the cadmium in the glass diffuses into and reacts with the ceramic grains during firing, but some of the volatile cadmium escapes to the atmosphere. However, when the firing is conducted in a controlled cadmium enriched atmosphere, the cadmium vapor pressure in the glass-ceramic mixture is maintained at a higher and much better controlled level, thus providing a less critical process and providing a product having more predictable and uniform properties.

When the initial glass contains no cadmium and the firing is conducted in a cadmium enriched atmosphere, some cadmium from the atmosphere enters and becomes a part of the glass. Subsequently the cadmium reacts with the ceramic grains.

The glass serves as a cadmium vehicle and a cadmium vapor pressure stabilizer in the vicinity of the grains. The presence of the glass in either case is further advantageous in that it permits the firing and densification of the body to be accomplished at a temperature from 1600° F, to 2050° F, at which temperatures the stabilization and control of the vapor pressure of cadmium or cadmium oxide is much more readily achieved than at the higher temperatures required for firing almost all glass-free titanate ceramics, e.g. 2100° F to 2600° F. This provides glass-reacted ceramic materials having more uniform and predictable properties.

DESCRIPTION OF THE PREFERRED EMBODIMENTS

Figure 1:
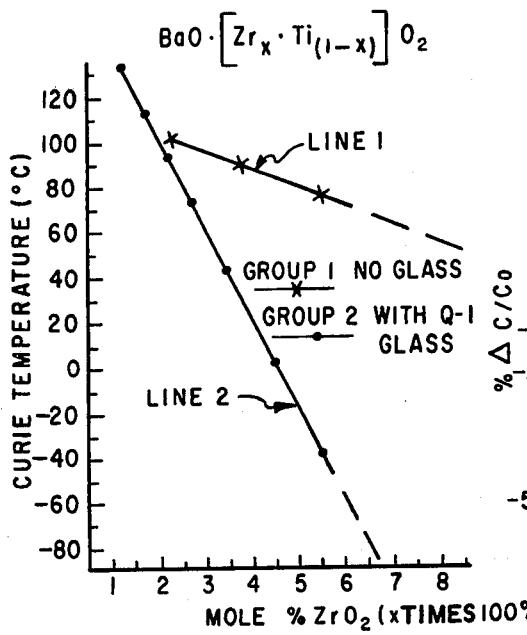
FIG. 1 shows a graph of Curie temperature ($T_c$) as a function of the zirconia content in a simple barium titanate zirconate (line 1), as well as the same function for a glass-reacted barium titanate zirconate of the present invention (line 2).

Various compositions of barium-titanate-zirconate were made starting with powders of barium carbonate, titanium and zirconium oxides. A stoichiometric ratio was maintained between large and small cations:

$$BaO \cdot (Ti_{1-x}Zr_x)O_2.$$

In a series of experiments various ceramic compositions were made wherein $x$ was 0, 0.0125, 0.0175, 0.0225, 0.025, 0.0375, 0.045 and 0.055. Since these numbers for $x$ are very small (e.g. there are never more than 5.5 zirconium atoms for every 100 titanium atoms), the above numbers for $x$ correspond very nearly to 0, 1.25, 1.75, 2.25, 2.5, 2.75, 3.75, 4.5 and 5.5 mole percent of the zirconia to the zirconia plus the titania in the ceramic (or of the zirconium to the zirconium plus titanium in the ceramic, or of the zirconate to the zirconate plus the titanate in the ceramic).

Dielectric materials using these ceramic compositions were first produced in the form of a simple high temperature ceramic and then additionally with glass as a glass-reacted-ceramic. In the latter case, glass powder was mixed with the sintered ceramic powder. Powders for disc samples were spray dried with a small amount of polyvinylalcohol (PVA) binder solution, then pressed into a cake to about 62% of theoretical density, and fired. The fired thickness of the samples was about 20 mils (0.05 cm). The glass-reacted-ceramic compositions included 12.5% by weight of a cadmium containing glass identified as Q-1 in Table I.

TABLE I

| | Compositions | | | | | |
|---|---|---|---|---|---|---|
| | Q-1 | Q-2 | Q-3 | Q-4 | Q-5 | Q-6 |
| CdO | 35.5% | 30.0% | 0% | 0% | 0% | 0% |
| $Bi_2O_3$ | 24.5 | 30.0 | 0 | 0 | 0 | 90.90 |
| PbO | 24.8 | 24.8 | 62.1 | 58.5 | 81.25 | 0 |
| ZnO | 4.0 | 4.0 | 10.0 | 9.0 | 0 | 1.98 |
| $B_2O_3$ | 5.2 | 5.2 | 13.1 | 13.0 | 0 | 3.39 |
| $SiO_2$ | 4.9 | 4.9 | 12.3 | 0 | 0 | 2.93 |
| $Al_2O_3$ | 1.0 | 1.0 | 2.5 | 0 | 0 | 0.80 |
| $GeO_2$ | 0 | 0 | 0 | 19.5 | 18.75 | 0 |

Firing in air of the simple ceramic discs (having no glass) was accomplished at 2550° F, while the glass-reacted-ceramic discs were air fired at between 1900°–2000° F. Silver patterns were printed on both surfaces, then fired at 1450° F. Capacitance was measured over a broad temperature range of 1KHz, and 2 volts rms. The Curie temperature and dielectric constant at the Curie temperature were determined for each capacitor.

The Curie temperature shifted downward in both groups of samples as the zirconium content increased. This is shown in the graph in FIG. 1. The glass-reacted-ceramic discs of group 2, represented by line 2 in FIG. 1, show a much more pronounced downward shift in Curie temperature as a function of zirconium content, than do the discs of group 1 having no glass that are represented by line 1.

The dielectric constants of the dielectric materials corresponding to the zirconium contents of 2.0, 2.5, 3.75 and 5.5 mole percent in the glass-reacted-ceramic (of line 2) are: at the Curie temperature 2600, 4300, 3500 and 2700, respectively; and at room temperature are: 1400, 1700, 3300 and 2200. The dielectric constant at the Curie temperature $K(T_c)$ of these glass-reacted-barium titanate zirconates (group 2) grows to a maximum as the zirconium content of the ceramic increases from zero to about 3 mole %. These two different phenomena in the group 2 discs are attributable to cadmium of the glass being reacted with and diffused into the titanate-zirconate grains during sintering. The dots and crosses in FIG. 1 represent data points.

With further reference to line 2 in FIG. 1, it is noted that at low zirconium content, i.e. less than about 1.5 mole percent, the glass-reacted ceramic shows a shift upward in Curie temperature. This is believed to be caused by the diffusion of Pb and Bi from the glass into the titanate lattice. Above 1.5 mole percent zirconium, the Curie temperature shifts down very rapidly. The substitution of zirconium at this level for some of the titanium in the lattice produces in the presence of cadmium a strong downward influence on the Curie temperature and the minor influence of the Pb and Bi is overwhelmed and masked by that of the cadmium and zirconium together.

Another set of experimental capacitors, groups 3 through 7, all having a glass-reacted-ceramic dielectric material, were made. The glass composition used was that designated as Q-2 in Table I, and contains 30% by weight cadmium oxide. The following process by which these capacitors were made includes the provision of various cadmium containing atmospheres during firing and sintering.

A ceramic composition consisting by weight of 95% $BaTiO_3$, 2.88% $CaZrO_3$, 1.42% $Nb_2O_5$, 0.28% $MgCo_3$ and 0.35% $U_3O_8$ was presintered at 2400° F in air and then jet pulverized to about 1 micron average particle size. Presintering of the high temperature ceramic is needed to form such compounds as $BaTiO_3$, $CaZrO_3$ and/or $[Ba, Ca, Ti, Zr]O_3$. The presence of free $TiO_2$, $ZrO_2$ or $Nb_2O_3$, for example, will tend to retard the wanted reaction of the ceramic with the glass. To this ceramic powder was added the above noted Q-2 glass in powder form in the amount of 10.5 weight percent of the glass ceramic mix. Homogeniety of the mix was achieved by wet milling for about 4 hours. This material was then cast in layers about 0.001 inch thick.

The layers were subsequently coated with a 70%Ag30%Pd electroding paste and stacked in a standard manner to provide a monolithic ceramic capacitor structure. Each capacitor had 40 active dielectric layers. The capacitor stacks were heated to 800° F for a 1 hour soak to burn off the organic binder materials of the ceramic and of the electroding paste. It is particularly important to thoroughly burn off the organic materials prior to sintering so as to avoid reduction of cadmium oxide in the glass by the organics during sintering. Cadmium has a higher vapor pressure than cadmium oxide making escape of cadmium more rapid and control of the firing atmosphere more difficult. In the event that organic binders are not employed, this precaution is of course not necessary.

It is also noted that if firing is accomplished in a tightly sealed sagger then a cadmium atmosphere would be operable. However, such tightly sealed firing containers present many practical problems in construction and a cadmium oxide atmosphere is preferred.

Some of these experimental monolithic capacitors designated group 3 were placed directly on an open slab for a conventional firing in air. Others of the monolithic capacitors, groups 4, 5, 6 and 7, were buried in piles of an inert powder. The basic inert powder consisted of particles of a calcined mixture of $ZrO_2$-$CaTiO_3$ wherein the zirconia and calcium titanate were of equal weight ratio. This basic portion of the course powder composition was chosen to be non-reactive with the capacitor bodies to be fired. However, many other basic compositions such as pure zirconia would be suitable. The inert powder is selected from the group of zirconium oxide and calcium titanate and mixtures thereof. In the mixture calcium titanate is substituted for up to 50 weight percent of the zirconium oxide. Powder containing $Al_2O_3$ or SiO should be avoided, which materials tend to react with and reduce the available cadmium and thus tend to inhibit the diffusion of cadmium into the ceramic. The ratio of the weight of the inert powder to the weight of the capacitor bodies buried therein was maintained at about 3:1. The inert powder was supported by a standard firing slab. The capacitors of groups 5, 6 and 7 were buried in the inert powder to which had been added 1%, 2% and 4%, respectively, of CdO powder by weight. Larger quantities than about 1 weight percent of $SiO_2$ and $Al_2O_3$ could be compensated by adding more CdO to the powder but at needless expense. All groups, 3-7, were fired at 2000° F for 2 hours.

The fired capacitor bodies of groups 3-5 had the same yellow-brown color while those of groups 6 and 7 were progressively more brown-grey.

Figure 2:
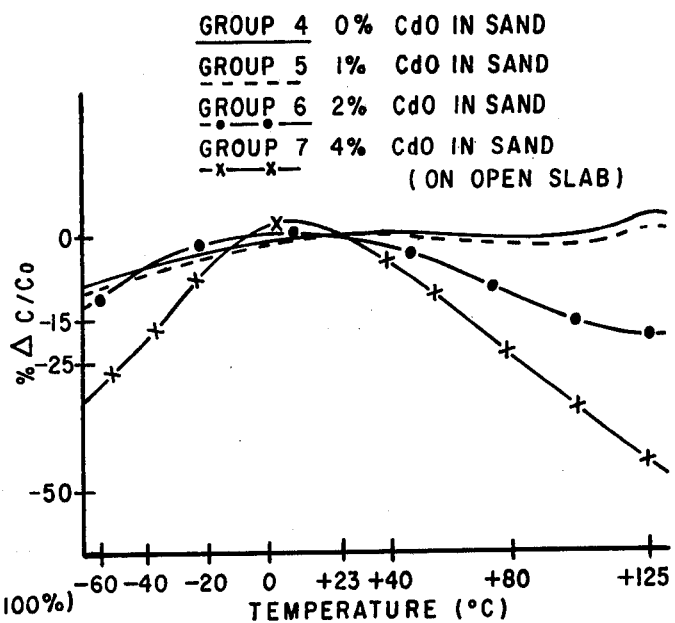
FIG. 2 shows a graph of the percent change in capacity of four groups of capacitors having a glass-reacted-ceramic dielectric as a function of temperature. The initial glass composition contained cadmium oxide. The dielectrics were fired in various cadmium containing atmospheres.

The average dielectric constant for the glass-reacted-ceramic of the monolithic capacitors in each group is shown in Table II, along with the corresponding dissipation factor of each capacitor group. In FIG. 2 the percent change in capacity (% $\Delta C$) relative to capacity at 25° C ($C_o$) as a function of temperature is plotted for each of the groups 4, 5, 6 and 7.

TABLE II

| CAPACITORS (Glass Q-3) | Firing | K (average) 25° C | D.F. (average) (%) | "Upper" Curied Temp. (° C) |
|---|---|---|---|---|
| GROUP 3 | On Slab | 1720 | 2.45 | 130 |
| GROUP 4 | In Powder + 0% CdO | 1690 | 2.40 | 130 |
| GROUP 5 | In Powder + 1% CdO | 1870 | 2.60 | 130 |
| GROUP 6 | In Powder + 2% CdO | 2500 | 2.75 | 10 |
| GROUP 7 | In Powder + 4% CdO | 3650 | 1.15 | 10 |

The difference in dielectric constant between groups 3 and 4 is within experimental error. The large decreases in Curie temperature and increases in K at room temperature are seen to be a function of the amount of cadmium oxide contained in the powder. More generally as the cadmium oxide vapor pressure at firing increases, the lower the Curie temperature becomes and the greater the K (25° C) becomes of the resulting glass-reacted-ceramic parts.

Glass-reacted-ceramic capacitors similar to those of group 3 were made employing 7 weight percent glass in the dielectric body. The capacitors were fired at 2050° F. The body was non-porous but an insufficient grain growth was achieved resulting in a low dielectric constant. It is accordingly estimated that no less than about 8 weight percent glass should be employed in the glass-reacted ceramic body fired at temperatures of 2050° C or below. Temperatures above 2050° C should not be used because, low cost Pd-Ag electrodes become less feasible (higher Pd/Ag ratios are required) and the volatility of the glass components such as Cd, Bi and Pb becomes much higher and more difficult to control.

Another set of experimental capacitors having a glass-reacted-ceramic dielectric were made wherein the glass component does not initially contain cadmium. Four widely different glass compositions were employed. The glass-reacted-ceramic dielectric materials of this set of capacitors were made using the same titanate-zirconate-niobium powder employed in the first experimental groups 3 through 7 described above. Each of the groups 8, 9, 10 and 11 of this set of capacitors included one of the four low temperature glass compositions, designated Q-3, Q-4, Q-5 and Q-6, respectively. The compositions of these glasses are given in Table I.

The presintered ceramic and glass powder materials were prepared and mixed together as described above in the ratio of 12 wt.% glass and 88 wt.% ceramic. A layer of this powder mixture dispersed in an organic medium was cast on a glass plate to about 0.030 inch (0.076 cm) in thickness. After heating to burn off the organic material, the layer was cut into squares about 0.5 × 0.5 cm and the squares removed from the glass. Some of the squares from each of the four groups (8-11) were fired on an open slab while others of the four groups were fired while being buried in a cadmium containing inert powder on a slab in an air environment. Firing in both cases was at 2000° F for 2 hours. Calcined $ZrO_2$-$CaTiO_3$ powder was used as before, in all cases containing 10% by weight of a homogeneously mixed CdO powder.

Figure 3:
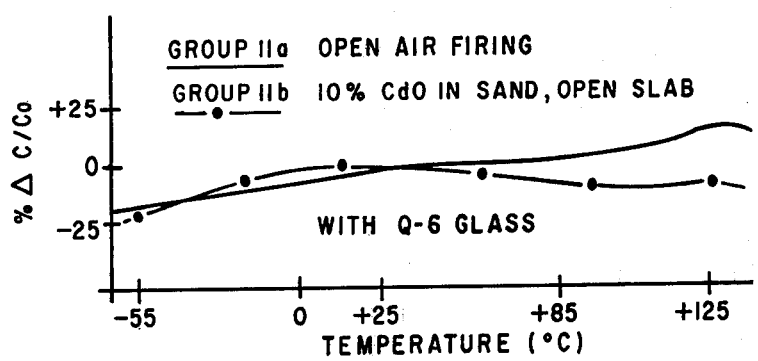
FIG. 3 shows a graph of the percent change in capacity of two other groups of capacitors having a glass-reacted-ceramic dielectric as a function of temperature. The initial glass composition was the same in each group and included a large quantity of bismuth oxide and no cadmium oxide. One group 11a was fired in air while the other group 11b was fired in a cadmium enriched atmosphere.

Silver electrodes were painted on both sides of each square, the silver was fired at 1450° F and the electrical properties of the disc type capacitors were then determined. These data are summarized in Table III. In each case, the units fired in cadmium containing inert powder exhibited a downward shift in Curie temperature and an increased dielectric constant at the Curie temperature. The four firings on an open slab 11 showed varying degrees of porosity while the units fired in the cadmium containing powder were all dense and non-porous. The properties including dielectric constant (K) at the Curie temperature ($T_c$) and percent dissipation factor (D.F.) are shown in Table III. The properties of capacity or K versus temperature for samples containing glass Q-6 are shown in FIG. 3 for the open slab fired capacitors of group 11a and for the cadmium in powder fired capacitors of group 11b. The cadmium diffusion into the ceramic body from the vapor state caused an enhanced densification, an increased dielectric constant and a downwardly shifted Curie temperature.

TABLE III

| CAPACITORS | GLASS | Firing | Degree of Porosity | K at 25° C | DF (%) | $T_c$ (° C) |
|---|---|---|---|---|---|---|
| GROUP 8a | Q-3 | On Slab | slight surface | 770 | 0.9 | +127 |
| 8b | Q-3 | Powder + 10% CdO | none | 1580 | 1.8 | + 92 |
| GROUP 9a | Q-4 | On Slab | slight surface | 830 | 1.9 | +127 |

TABLE III-continued

| CAPACITORS | | GLASS | Firing | Degree of Porosity | K at 25° C | DF (%) | $T_c$ (° C) |
|---|---|---|---|---|---|---|---|
| | 9b | Q-4 | Powder + 10% CdO | none | 1680 | 2.0 | + 96 |
| GROUP | 10a | Q-5 | On Slab | very porous | — | — | — |
| | 10b | Q-5 | Powder + 10% CdO | none | 1600 | 2.3 | ≈+100 |
| GROUP | 11a | Q-5 | On Slab | slight | 980 | 1.3 | +135 |
| | 11b | Q-5 | Powder + 10% CdO | none | 1225 | 0.9 | ≈ flat* |

*FIG. 3

When making glass-reacted-ceramic materials wherein a cadmium containing glass is reacted with a titanate zirconate ceramic during firing in an air atmosphere, it has been found necessary to limit the glass formers to 14 percent or less by weight in the glass so as to avoid their inhibiting influence over the desired cadmium diffusion from the glass into the grains. It is now no longer necessary to so limit the glass formers when a cadmium enriched atmosphere is employed during firing, because a greater source of cadmium is available for diffusing into the ceramic and its supply is usually not significantly diminished by reactions with the glass formers.

Figure 4:
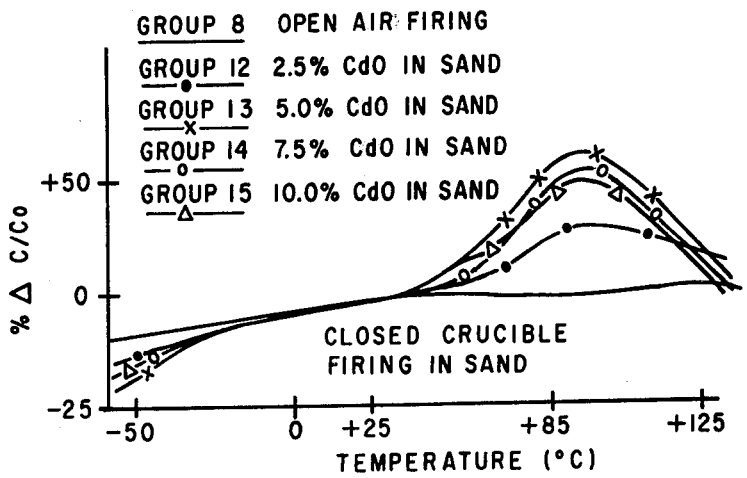
FIG. 4 shows a graph of the percent change in capacity of five other groups of capacitors having a glass-reacted-ceramic dielectric as a function of temperature. The initial glass compositions contained no cadmium. Each group was fired in an atmosphere having a different cadmium content than for the other groups.

Another set of experimental capacitors similar to those of group 8-11 were made using the same materials and by the same process except that only Q-3 glass was used and except for variations in the firing steps. The cast discs were divided into four groups, namely groups 12, 13, 14 and 15. Twelve discs of each group were buried in the $ZrO_2$-$CaTiO_3$ powder having varying amounts of cadmium oxide homogeneously mixed therewith. The powder was contained in an alumina crucible in each case and another identical crucible was inverted and fitted over the powder containing crucible to serve as a top therefor. The volume of powder and the volume of overlying air enclosed were equal (about 26cc each). The particular amount of cadmium oxide mixed in the powder for the firing of each of the groups 12-15 is indicated in Table IV, as are the corresponding electrical performance results. Firing was accomplished at 2000° F for 1½ hours. The graph of FIG. 4 shows the change in capacity as a function of temperature for these four groups. The data for the open slab fired capacitors of group 8 is repeated in Table IV and FIG. 4 for convenient comparison. The amount in percent by weight of cadmium oxide present in the fired glass-reacted-ceramic as shown in the table, was determined by electron micro-probe analysis, using a 50 microns diameter beam at 20 KV and 50 milliamperes. The data is also shown in Table IV. Similar analysis of the titanate-zirconate grains of group 12 and 13 material indicate the presence of zero and 0.5 weight percent cadmium oxide, respectively. Similar analysis of the glass-reacted ceramic materials of groups 8, 12, 13, 14 and 15 showed a lead oxide content of about 5.6 weight percent for each and every sample indicating that there was no difference among the groups in lead out-diffusion occurring during firing.

TABLE IV

| CAPACITORS (Glass q-3) | Firing | K at 25° C | DF (%) | $T_c$ | CdO in Dielectric (wt. %) |
|---|---|---|---|---|---|
| GROUP 8a | On Slab | 770 | 0.9 | +127° C | 0 |
| GROUP 12 | Powder + 2.5% CdO | 1140 | 2.0 | + 98 | 2.8 |
| GROUP 13 | Powder + 5.0% CdO | 1560 | 2.3 | + 94 | 3.6 |
| GROUP 14 | Powder + 7.5% CdO | 1430 | 2.2 | + 96 | 5.8 |
| GROUP 15 | Powder +10.0% CdO | 1380 | 1.9 | + 96 | 6.2 |

The dielectric constant is seen to peak as the cadmium oxide content grows to about 5% in the powder, for the closed crucible fired units. More cadmium oxide above the 5% causes the K to diminish. This peak condition appears to correspond roughly to the burying of units of groups 8-11 in inert powder having 10% CdO and firing in an open atmosphere. It is generally advantageous to fire in controlled cadmium containing atmospheres corresponding to the cadmium oxide vapor pressure near this peak condition to obtain an optimally high dielectric constant at room temperature. Thus for firing in inert powder on an open slab the cadmium oxide additive in the powder is preferably in the range of 6 to 14 weight percent when the initial glass composition contains small quantities (e.g. 10%) or no cadmium oxide; and from 1 to 6 weight percent cadmium oxide in the powder when the initial glass contains approximately 30 weight percent cadmium oxide. However, for a closed firing of a non-cadmium containing glass-ceramic cake to obtain an optimum dielectric constant, as in Table IV, the cadmium oxide should amount to from about 3 to 7.5 weight percent of the inert powder.

These 30 mil thick disc capacitors of groups 12 through 15 employed a starting glass composition that contained no cadmium. It is believed that for these thick discs the cadmium diffused uniformly through the glass-ceramic body because the corresponding curves of FIG. 4 are sharp in the vicinity of the Curie temperature indicating that all regions of the dielectric body have about the same composition and Curie temperature. During an initial period of the firing cycle and prior to the realization of sintering and densification, the ceramic dielectric is somewhat porous and the hot cadmium vapors may diffuse through and saturate the pores of the dielectric.

In a monolithic capacitor that is on the order of 30 mils long and wide, which employs a cadmium free starting glass, cadmium derived solely from the firing atmosphere would be expected to penetrate the buried electrode films more slowly than the rate by which it diffused laterally through the sides of the body, the latter path being free from the blocking effect of the electrode films. Thus, similar results would be expected for disc and monolithic structures of similar dimensions in thickness and buried electrode width, respectively, after both were fired in the same cadmium oxide atmosphere.

In a related experiment, monolithic capacitors having buried electrodes were made having 10 active dielectric layers, each layer being about 0.001 inch thick (1 mil) and having an active area of 0.055 square inches. The glass employed was type Q-1 and the ceramic formulation was the same as for the above described group 3 capacitors. A control group 16 was fired at 2000° F for 1 hour on a slab in an open air atmosphere. Capacitors of groups 17, 18, 19 and 20 were each fired in a closed crucible containing inert powder having 2.5 wt.% cadmium oxide, and held at 1950° F for 1 hour, 3 hours, 6 hours and 12 hours, respectively. The resulting dielectric constants exhibited by capacitors of groups 16 through 20 were 3000, 4800, 5100, 5500 and 6200, respectively, while for all groups the dissipation factor remained within 1.8% to 2.2% and the Curie temperatures varied from 22° C for group 16 to 25° C for group 20. As the firing time increased there was a strong tendency for the capacity versus temperature curve to become sharper and for the ceramic grains to grow larger. Large grains having the approximate dimensions of the thickness of the dielectric layers were observed in capacitors of group 20. Thus, it becomes possible by the method of this invention to further increase grain growth in the presence of diffused cadmium ions, without substantially affecting the Curie temperature. This is accomplished in general by employing a glass-ceramic mixture wherein the glass contains at least 20% CdO by weight and firing the mixture for more than 3 hours in a closed crucible that also contains an additional source of cadmium. These results could not at all be achieved in an open slab firing because the volatile cadmium and other volatile oxides would be lost.

In yet another experiment three other lots of monolithic capacitors, groups 21, 22 and 23 were constructed in the same manner using the same materials as for capacitors of groups 16-20, except for the firing conditions. It will be convenient to compare these three groups with the capacitors of group 17 since they were also fired in a closed crucible with the inert powder containing 2.5% by weight cadmium oxide.

The capacitors of group 21 were fired at 1850° F for 2 hours. The dielectric constant dropped to 4300 and dissipation factor remained about the same at 2.1%.

The capacitors of group 22 were fired at the even lower temperature of 1775° F for 3 hours providing a dielectric constant of 3900 and a slightly higher dissipation factor of 2.6%.

The capacitors of group 23 were fired at 1650° F for 3 hours and surprisingly provided a nonporous body (as determined by a standard dye test) having a dielectric constant of 2200 and a dissipation factor of 2.3%. The temperature coefficient of capacity (TCC) of these capacitors were progressively flatter in the order of groups 17, 21, 22 and 23. The TCC of group 23 capacitors was within +0 to −37% over the temperature range of −55° C to +125° C.

When more than one glass-reacted body that contains cadmium in the glass are fired simultaneously in the same closed crucible, the cadmium source for one body is represented by the other and vice versa. Thus no cadmium containing powder need be used especially when a large number of such bodies are fired in the same closed crucible.

It is concluded that this technique of extended firing in a closed crucible with a source of cadmium contained therein is capable of providing fully densified high dielectric constant bodies at peak firing temperatures as low as 1600° F when the glass content in the glass-ceramic body is as low as 10.5% by weight. Pure silver melts at 1764° F and could have been employed as the electrodes of the capacitors of group 23 providing a very low cost high conductivity electrode. Such low temperature firing capacitors combine the highly useful properties of a relatively flat TCC and a dielectric constant higher than about 2000. It is also anticipated that alternatively the glass content may be reduced and the firing temperature maintained for 3 hours or more in the higher ranges near 1950° F to provide dielectric constants of greater than 5000. Thus the technique of extended firing of the glass-reacted-ceramic to provide continued grain growth without further shifts in Curie temperature leads unexpectedly to the further enhancement of densification permitting a further lowering of the peak sintering temperature or lower glass content while providing a dense high dielectric constant body.

What is claimed is:

1. A method for making a glass-reacted-ceramic body comprising mixing a major proportion of a finely ground ceramic comprised of barium titanate and an alkaline-earth-metal zirconate and a minor proportion of a pulverized low temperature glass; forming a cake of said mixture; placing a quantity of cadmium oxide powder adjacent to said cake; and firing said cake and said cadmium oxide powder at a temperature of between 1600° F to 2050° F so that said cadmium oxide powder provides during said firing a controlled and enriched cadmium atmosphere external of said cake to transform said cake during said firing into a sintered body and to cause cadmium ions from said cadmium of said atmosphere to react with said ceramic and to diffuse into the titanate lattice thereof, whereby grain growth in said body is enhanced and the Curie temperature of said body is shifted downwardly.

2. The method of claim 1 additionally comprising preparing a homogenous mixture of an inert powder selected from the group of zirconium oxide and calcium titanate and mixture thereof and said cadmium oxide powder, wherein said placing is accomplished by burying said cake prior to said firing in a pile of said inert powder mixture, said inert powder being inert at said firing temperature with respect to said cadmium and said cake.

3. The method of claim 2 wherein said inert powder consists of zirconium oxide, wherein calcium titanate is substituted for up to 50 percent of said zirconium oxide.

4. The method of claim 2 wherein said cadmium oxide in said inert powder amounts to from 1% to 14% by weight of said inert powder.

5. the method of claim 4 wherein said low temperature glass contains approximately 30% by weight cadmium oxide and said cadmium oxide in said inert powder amounts to from 1% to 6% by weight of said inert powder.

6. The method of claim 4 wherein said low temperature glass contains less than 10 weight percent cadmium oxide and said firing of said buried cake is accomplished on an open slab.

7. The method of claim 4 wherein said low temperature glass contains less than 10 weight percent cadmium oxide, said cadmium oxide in said inert powder amounts to from 3 to 7.5 weight percent of said inert powder, and said firing of said buried cake is accomplished in a closed crucible.

8. The method of claim 1 wherein said mixing includes adding an organic binder to said ceramic and said glass, and said method additionally comprises heating said cake prior to said firing to burn off said organic binder.

9. The method of claim 1 wherein said glass contains at least 20% by weight of cadmium oxide and said firing of said cake with said cadmium oxide powder is effected in a closed crucible for more than 3 hours.

10. The method of claim 9 wherein said temperature of firing is from 1600° F to 1764° F.

11. A method for making a glass-reacted-ceramic body comprising mixing a major proportion of a finely ground ceramic comprised of barium titanate and an alkaline-earth-metal zirconate and a minor proportion of a pulverized low temperature glass; forming layers of said glass-ceramic mixture; coating said layers with an electroding paste, stacking said electroded layers to form a cake; placing a quantity of cadmium oxide powder adjacent to said cake; and firing said cake and said cadmium oxide powder at a temperature of between 1600° and 2050° F so that said cadmium oxide powder provides during said firing a controlled and enriched cadmium atmosphere external of said cake to transform said cake during said firing into a sintered body and to cause cadmium ions from said cadmium of said atmosphere to react with said ceramic and to diffuse into the titanate lattice thereof.

12. The method of claim 11 wherein said electroding paste is comprised of silver and palladium.

* * * * *